March 29, 1955     A. HAUSER     2,705,051
FLUID DRIVEN PROPELLER
Filed July 5, 1950
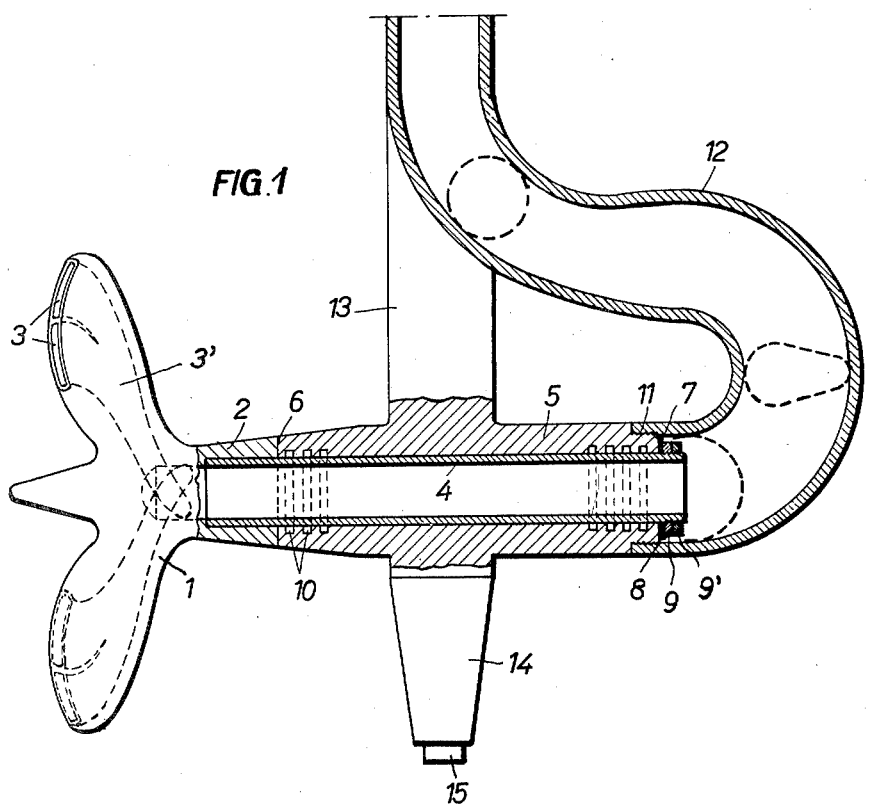
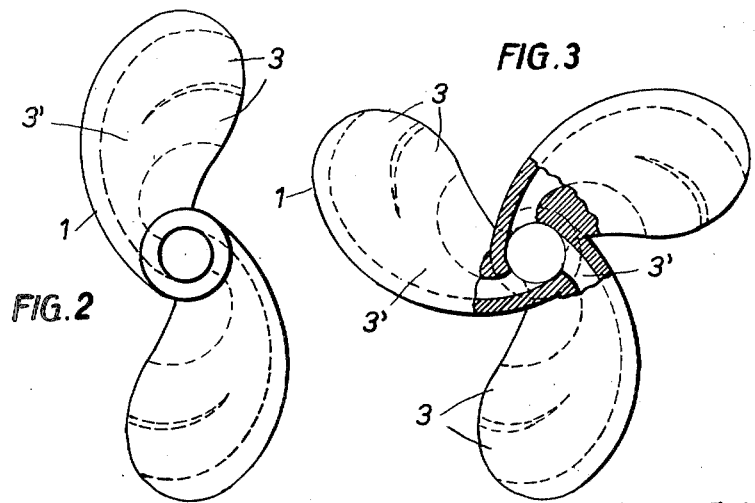
INVENTOR:
Arnold Hauser

United States Patent Office 2,705,051
Patented Mar. 29, 1955

2,705,051
FLUID DRIVEN PROPELLER

Arnold Hauser, Las Palmas, Gran Canaria, Spain

Application July 5, 1950, Serial No. 172,125

Claims priority, application Switzerland
September 13, 1949

1 Claim. (Cl. 170—135.4)

My present invention relates to a fluid-flow propeller drive, to be used in particular for marine propulsion, in which operating water is pumped through ducting in a propeller stub shaft, propeller hub and propeller blades, and discharged under pressure from the latter to the ambient water.

My present invention may be used in other technical fields, e. g. as low-pressure pump for great outputs and small heads, as turbine screw driven by compressed air, as airplane propeller, as cooling fan whereby the compressed air derived from the compressor first is cooled so that, through expansion after its passage through the turbine, it gives rise to a temperature drop and, through the mixing with the delivery air, to a cooling of the latter, or as small-size reaction turbine having axial air admission, in particular for fine bores of injection nozzles in compression-ignition engines having maximum rotary speeds and vibrationless spindles.

The conventional system for propelling ships involves mechanical torque drive means, and comprises not only at least one propeller shaft, a coupling, a reversing and reducing gear and the like as power transmission components, but also at least one flywheel, a connecting rod, a crankshaft and the like as engine components. All the said components are rigidly interconnected and together possess a great moment of inertia. The propeller blades of a conventional marine propulsion system are subjected in operation to bending stresses, and the arbor to torsional stresses, and most of the components of the conventional mechanical drive may be subjected to comparatively great wear. A conventional drive mechanism may cause vibrations in the ship. Further, when the ship is sailing in ballast, the propeller blades may emerge above the water surface and, thus, operate at low efficiency. Vessels having a mechanical propulsion system, when moving to and from the moles, have to be towed about and cannot readily turn, which may prove of disadvantage when maneuvering in narrow ports, especially as regards the time lost. Further, the engine has to be aligned with the propeller, in most cases has to be disposed in the first-class midship space, and requires much space.

In order to obviate the said disadvantages, the propulsion system according to my present invention involves a propeller having at least two blades, and is characterised in that the propeller has an axial inlet duct for pressurized fluid, and branch ducts formed in the blades, the outlet ends of said branch ducts being situated (with respect to the sense of rotation of the propeller) on the trailing blade edges in order to drive the propeller through the reaction of the ejected fluid.

A further advantage of the marine propulsion system disclosed by my present invention is that the engine does not have to be aligned with the propeller, and that it does not have to be installed in the first-class midship space, but may be put in any second-class space, e. g. in the bow or stern, since the unit is locally independent of the propeller.

Since the entire unit has a low moment of inertia, it may be readily adapted to the exterior conditions, i. e. the rotary speed of the reaction propeller can be instantaneously adapted to the force of the waves and the currents induced thereby.

Torsional impacts as occur in heavy seas when using a mechanical power transmission, and the ship's vibrations and the engine and propeller overload induced by such impacts can be eliminated by means of the present propulsion system. Fractures thus are eliminated, and the vessel is capable of maintaining a uniform speed also in a rough sea.

Complicated intermediary mechanisms such as precision gearing, clutch, blade-setting mechanism are eliminated, and the capital investment, erection, maintenance, and wear and tear are substantially reduced. The number of engine attendants may be substantially reduced.

Various examples of the invention, as applied to marine propulsion, are shown by way of example in the accompanying drawing, in which—

Fig. 1 is a longitudinal section through a propeller with a suitable support, in accordance with the invention.

Fig. 2 a front view of a propeller having two blades, and

Fig. 3 a front view of a three-blade propeller of a second example, partly in section.

The propeller comprises a plurality of similar blades 1 spaced uniformly on its boss 2, which abuts against a shoulder 6 of a bearing 5, as shown in Figs. 2 and 3. The blades 1 are formed hollow and each comprises two ducts 3 of which the outlet ends are disposed on the trailing blade edges, referring to the sense of rotation of the propeller. The said ducts inside each blade merge to a single duct 3'. The walls of the ducts 3, 3' are formed as turbine rotor surfaces, whilst the outside surface of the blades 1 is formed as propeller surface. The optimum curvature of the said walls and surfaces is determined by trial so as to attain a good efficiency both for the turbine portion and the propeller portion.

The only part fixed to the propeller is a hollow stub shaft 4 for guiding the propeller and for the axial admission of water under pressure to the turbine portion of the blades 1. The stub shaft 4 is not substantially longer than a pedestal body 5 in which the said shaft is rotatable free of any further rotary masses rigidly secured thereto. The hydraulic arrangement, therefore, has a much smaller moment of inertia than a mechanical arrangement. One end of the shaft 4 is firmly mounted in the boss 2, whilst the other end is threaded and through an annular disc 8 abuts against a shoulder 7 of the body 5. The shaft 4 is held to the latter by means of a nut 9 and counternut 9'.

A plurality of oil grooves 10 are provided in the pedestal body 5. One end of the latter is threaded at 11 to be connected to an arcuate tubular duct 12 through which water is supplied under pressure for operating the turbine portion of the rotary structure which latter comprises the parts 1—4, 7—9 and 9'. The cross-section of the duct 12 is circular at the threads 11, egg-shaped or oval upstream of the latter, and again circular in the vicinity of its vertical portion, as shown in Fig. 1.

A substantially vertical post 13 is fixed to the top of the pedestal body 5 and the duct 12 for the purpose of stiffening or bracing the whole arrangement. The bottom of the body 5 is provided with a prop 14 which in turn is adapted to be supported through a journal 15 on a part which is fixed to the hull of the vessel. It is to be understood that the entire structure shown in Fig. 1 may be swung about an axis which coincides with the vertical axis of the members 13—15.

What I claim as new and desire to secure by Letters Patent, is:

A propeller comprising a hub carrying a plurality of similar blades, each blade being provided with two internal ducts of which the outlet ends are disposed on the trailing blade edges and a single duct to which said two ducts merge and opening internally of said hub, the walls of said ducts being formed as turbine rotor surfaces while the outside surfaces of the blades being formed as propeller surfaces, whereby said propeller may be driven by the turbine effect produced by fluid under pressure on said turbine rotor surfaces of said duct walls.

References Cited in the file of this patent

UNITED STATES PATENTS 606,986    Carteretal _____ July 5, 1898

(Other references on following page)

UNITED STATES PATENTS

| | | |
|---|---|---|
| 1,081,607 | Hall | Dec. 16, 1913 |
| 1,119,178 | Krantz | Dec. 1, 1914 |
| 1,385,130 | Hooke | July 19, 1921 |
| 1,822,573 | Fitzgerald et al. | Sept. 8, 1931 |
| 1,972,335 | Gardner | Sept. 4, 1934 |
| 2,023,760 | Dornier | Dec. 10, 1935 |
| 2,041,796 | Stalker | May 26, 1936 |
| 2,058,361 | Sherwood | Oct. 20, 1936 |
| 2,396,130 | Sbrilli | Mar. 5, 1946 |
| 2,511,156 | Glass | June 13, 1950 |

FOREIGN PATENTS

| | | |
|---|---|---|
| 11,668 | Great Britain | May 23, 1899 |
| 22,309 | Great Britain | Nov. 6, 1897 |
| 493,771 | France | May 13, 1919 |
| 795,517 | France | Jan. 8, 1936 |